United States Patent [19]

Giordano, Jr. et al.

[11] Patent Number: 4,609,686

[45] Date of Patent: Sep. 2, 1986

[54] 100 PERCENT SOLIDS EPOXY, NITRILE COATING COMPOSITIONS AND METHOD OF MAKING SAME

[75] Inventors: Paul Giordano, Jr., Hudson; Richard C. Smierciak, Streetsboro, both of Ohio

[73] Assignee: The Standard Oil Company, Cleveland, Ohio

[21] Appl. No.: 725,283

[22] Filed: Apr. 19, 1985

[51] Int. Cl.[4] ............... C08G 59/20; C08G 65/04; C08G 65/26

[52] U.S. Cl. .................... 522/31; 522/33; 522/37; 522/43; 522/46; 522/166; 522/170; 525/488; 525/504; 525/507; 525/514; 528/99; 528/103; 528/362

[58] Field of Search .............. 528/99, 103, 362; 525/504, 507, 488, 514; 522/31, 33, 37, 43, 46, 166, 170

[56] References Cited

U.S. PATENT DOCUMENTS

| | | |
|---|---|---|
| 3,410,810 | 11/1968 | Tucker .................... 528/362 |
| 3,530,096 | 9/1970 | Dobinson et al. . |
| 3,721,617 | 3/1973 | Watt . |
| 3,816,278 | 6/1974 | Watt . |
| 4,202,920 | 5/1980 | Renner et al. .......... 528/362 X |
| 4,410,680 | 10/1983 | Brownscombe et al. ...... 528/362 X |
| 4,448,940 | 10/1984 | Koyama et al. ............ 528/99 X |
| 4,461,879 | 7/1984 | Bauer et al. . |

*Primary Examiner*—Earl Nielsen
*Attorney, Agent, or Firm*—Teresan W. Gilbert; Joseph G. Curatolo; Larry W. Evans

[57] ABSTRACT

100 percent solids epoxy, nitrile coating compositions comprising:

(a) epoxy resins, and
(b) epoxy-nitrile monomers which are useful for protective coatings.

The invention further includes a process for producing the 100 percent solids epoxy nitrile coating compositions comprising:

(1) forming a mixture of the epoxy resins with the epoxy nitrile monomers and curing agents,
(2) applying the mixture to a substrate to form a coating, and
(3) curing the coating so that in situ copolymerization of the epoxy resin and epoxy-nitrile monomer results in a multifunctional epoxy nitrile coating system.

24 Claims, 2 Drawing Figures

100 PERCENT SOLIDS EPOXY, NITRILE COATING COMPOSITIONS AND METHOD OF MAKING SAME

BACKGROUND OF THE INVENTION

The present invention is directed generally to epoxy nitrile coating compositions for use as protective surface coatings on various substrates such as metal, wood, plastic, paper and the like. This invention relates to novel 100 percent solids epoxy nitrile coating systems. In another aspect, the invention relates to novel coating compositions and the process for producing the coating compositions which coatings have excellent appearance, superior adhesion, excellent hardness, superior barrier properties, high gloss and excellent corrosion resistance.

The use of epoxy coatings are known in the art. Representative examples of epoxy resin coating compositions and their preparation include those disclosed in U.S. Pat. No. 3,530,096. Epoxy coatings exhibit high adhesion, toughness and chemical resistance. Most epoxy coating systems used today are solvent based or water based. Solvent based coatings are disadvantageous in that large amounts of volatile organic solvents are present. These solvents may be costly and hazardous. The solvents must be removed from the final coatings which requires considerable thermal energy. Further, if hazardous, the solvents must be recovered or incinerated as they may not be exhausted into the environment. Water based coatings are disadvantageous in that they are not continuous and have been found to contain more pinholes and voids than the solvent based coatings.

As a result, the search for an essentially solvent-free coating process has led to the use of solventless systems. The advantages of a solventless epoxy coating system includes the minimization of surface defects due to the absence of solvents and excellent heat and chemical resistance. However, these coating compositions have increased sensitivity to humidity causing blushing and have poor impact resistance end flexibility.

Additionally, nany epoxy coating systems also require high curing temperatures, in excess of 175° C. Further, epoxy coating systems do not exhibit particularly good moisture barrier properties.

The use of nitrile resin coatings are known in the art. Nitrile resin coatings exhibit high moisture barrier properties. However. nitrile resin coatings exhibit poor adhesion to the substrate when cured at temperatures below 200° C. Representative examples of nitrile resin coating compositions and their preparation include those disclosed in U.S. Pat. Nos. 4,379,875 and 4,374,948. These patents teach that the nitrile resin coatings are thermally cured. Thermally cured nitrile resin coating processes require a high thermal energv input.

The current approach as found in U.S. Pat. No. 3,530,096 is to synthetically introduce a nitrile functional group into an epoxy resin by substituting the hydroxyl functional group with the nitrile functional group. The process uses inert solvents such as tolune or xylene for the reaction of substituting nitrile groups into the epoxy resin. This process however, results in a coating system which suffers from severe cratering and consequently poor corrosion protection.

A general discussion as to how coatings function is available in, Kirk-O thmer Encyclopedia of Chemical Technology, Vol 7, p. 113"Corrosion and Corrosion Inhibitors", John Wiley and Sons, Inc., 1979, and L. Blecher, D. H. Lorenz, H. L. Lowd, A. S. Wood and D. P. Wyman, "Handbook of Water-Soluble Gums and Resins", R. L. Davidson, ed., McGraw Hill, N.Y. 1980.

It is an object of this invention to provide epoxy nitrile coating compositions in a 100 percent solids, solvent free system to avoid use of cyclable solvents. It is another object of this invention to combine the excellent adhesion, chemical resistance and durability of the epoxy function with the verv good moisture barrier properties of the nitrile function. It is another object of this invention to provide hard epoxy nitrile coating compositions which are corrosion resistant, prevent metal corrosion and have no pinholes or voids.

These and other objects, together with the advantages over known methods shall become apparent from the specification which follows and are accomplished bv the invention as hereinafter described and claimed.

SUMMARY OF THE INVENTION

It has now been found that in situ copolymerization of a bifunctional epoxy-nitrile monomer with an epoxy resin results in a multifunctional system with improved properties. The present invention includes a solventless coating system based on the multifunctional epoxy-nitrile monomer which serves as a reactant with and a solvent or the epoxy resin. The finished coating of the present invention has all the advantages of a 100 percent solids system and further does not exhibit cratering but does exhibit superior adhesion and corrosion control.

This invention relates to a coating composition comprising epoxy resins and epoxy-nitrile monomers. The novel coating compositions of the present invention are resistant to chemical attack and adhere excellently to various substrates. The novel coating compositions of the present invention avoid solvent volatility and the need for solvent recovery.

The invention further includes a process to produce said coating compositions comprising:

(1) forming a mixture of an epoxy resins with an epoxy nitrile monomer and curing agents, (2) applying the mixture to a substrate to form a coating, and (3) curing the coating so that in situ copolymerization of the epoxy resin and epoxy-nitrile monomer results in a multifunctional epoxy nitrile coating system.

The epoxy nitrile coating compositions of this invention can be used for industrial corrosion protection of metals where coating properties such as durability, adhesion and corrosion resistance are important. Major uses for the coatings are for pipelines, tankers, appliances, and electrical equipment. Further, the coating compositions may also be used in other fields such as adhesives, sealants, automotive parts and the like.

DETAILED DESCRIPTION OF THE INVENTION

Figure 1:
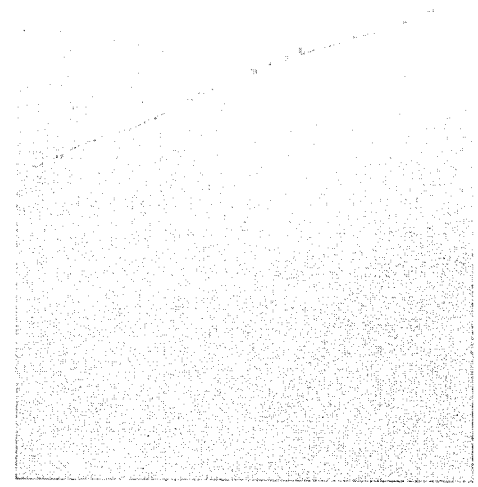
FIG. 1 is a 35 mm photograph of a salt fog tested metal substrate coated with Applicants' inventive epoxy nitrile coating composition of Example 1.

The coating compositions of the instant invention are the reaction product of the reaction of epoxy resins and epoxy-nitrile monomers in the presence of curing agents.

The coatings compositions of the present invention contain an epoxy resin. Epoxy resins are characterized by the presence of a three-membered cyclic ether group commonly referred to as an epoxy group which is represented as follows:

(I)

There are two distinct classes of epoxy resins, diglycidyl ethers of bisphenol A and Novolak Epox resins. Molecular weight and epoxide equivalent are controlled by varying the reactant ratios.

These epoxy resins can be employed either alone or in combination. The coatings compositions generally contain, in percent of the total weight, from about 95 percent to about 5 percent, preferably from about 85 percent to about 35 percent, and most preferably from about 80 percent to about 50 percent of the epoxy resin.

The conventional epoxy resins are diglycidyl ethers of bisphenol A derived from bisphenol A (4,4¹-isopropylidenediphenol) and epichlorohydrin. The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is (II)

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A (represented in formula II, where n=0), which may be named 2,2-bis(p-(2,3-epoxypropoxy)-phenyl)propane, and smaller proportions of polymers in which n is an integer equal to 1, 2, 3, etc. This product exemplifies epoxide monomers and prepolymers, having a moderate molecular weight, preferably of the order of 1,000 or less, which may be cross-linked or otherwise polymerized in accordance with the invention. Solid diglycidyl ethers of bisphenol A are also useful epoxy resins for the instant invention. The structure is the same structure as above, in formula II, except the average value of n ranges from 1 to 20. High molecular weight diglycidyl ethers of bisphenol A are also useful for the instant invention. The molecular weight of the product is a function of the ratio of epichlorohydrin-bisphenol A. The average value of n ranges from 1 to 20 and as the n value becomes greater the molecular weight of the resin increases.

The Novolak Epoxy resins are obtained by the known reaction of epichlorohydrin with a novolak resin. First, a phenol-formaldehyde type resin is obtained primarily by the use of acid catalysts and an excess phenol. The Epoxy Phenol-Novolak Resins are then prepared from the phenol-formaldehyde condensation products with subsequent epoxidation, utilizing epichlorohydrin. The structure usually assigned this resinous structure is

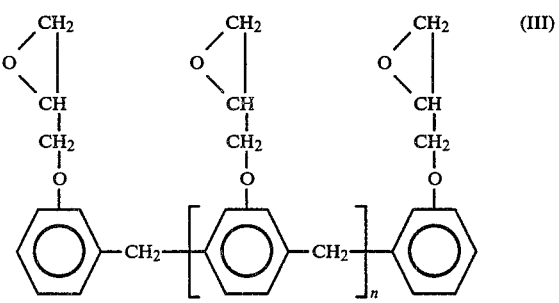
(III)

The Epoxy Novolak resin can range from a high viscosity liquid, (an example of which is formula III, where n averages about (0.2) to a solid, (where the value of n in formula III is greater than 3).

Many other epoxide materials are available in polymerizeable monomeric or prepolymeric forms. Typical epoxide or polyepoxide materials include but are not limited to cyclohexene oxides, epoxidized cycloalkenes, glycidyl esters of acrylic acid, glycidyl alkyl ethers, glycidyl aryl ethers, esters of epoxidized cyclic alcohols, esters of epoxidized cycloalkanecarboxylic acids, halogenated epoxides, styrene oxide, bisphenol F epox-

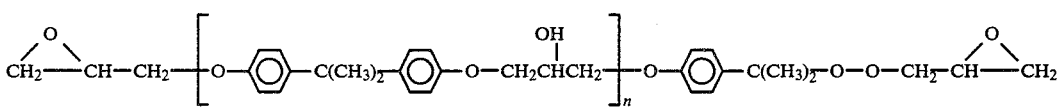
(II)

ides, and others.

The cyclohexene oxides and their derivatives and homologues useful as epoxide materials include but are not limited to cyclohexene oxide, 1,2-epoxycyclohexene, vinylcyclohexene dioxide, more specifically named 3-(epoxyethyl) -7- oxabicyclo (4.1.0) heptane, and 1,2-epoxy-4-(epoxyethyl)cyclohexane. Most preferred is cyclohexene oxide.

The epoxidized cycloalkenes and their derivatives and homologues useful as epoxide materials include but are not limited to the derivatives of ethylene oxide, propylene oxide, trimethylene oxide, 3,3-bis(chloromethyl)-oxetane, tetrahydrofuran, dicyclopentadiene dioxide, 1,3,5-trioxane as well as 2,3 epoxybutane, polycyclic diepoxide and 3,4-8,9-diepoxy tricyclo-[5.2.1.0$^{2,4}$]-decane. Most preferred is polycyclic diepoxide.

The glycidyl esters of acrylic acid and their derivatives and homologues include but are not limited to the glycidyl derivatives of methacrylic acid, acrylonitrile, crotonic acid, as well as allylglycidyl ether, 1-allyloxyl-2,3-epoxypropane, glycidyl phenyl ether, and 1,2-epoxy-3-phenoxypropane. Most preferred are epoxidized methacrylic acid and acrylonitrile. However, coating compositions must be prepared with at least one non-epoxy-nitrile monomer.

The glycidyl alkylethers and their derivations and homologues include but are not limited to glycidyl octyl ether, decyl glycidyl ether, dodecyl glycidyl ether and glycidyl tetradecyl ether. Most preferred is glycidyl octyl ether.

The glycidyl aryl ethers and their derivatives and homologues include but are not limited to benzyl glycidyl ether, methyl benzyl glycidyl ether, dimethyl benzyl glycidyl ether, ethyl glycidyl ether. Most preferred is benzyl glycidyl ether.

Esters of epoxidized cyclic alcohols or of epoxidized cycloalkanecarboxylic acids or of both and their derivatives and homologues include but are not limited to esters of epoxidized cyclohexanemethanol and epoxidized cyclohexane-carboxylic acid such a diepoxide (3,4-epoxy-cyclohexyl) methyl 3,4-epoxycyclohexane-carboxylate, esters of a substituted (epoxycycloalkyl) methanol and a dibasic acid such as bis (3,4-epoxy-6-methylcyclohexyl)-methyl) adipate. Diepoxide monomeric materials may be obtained conveniently as bis-(epoxyalkyl) ethers of glycols, an example being the diglycidyl ether of 1,4-butanediol, that is, 1,4-bis-(2,3-epoxypropoxy)butane. This diepoxide is related to the diglycidyl ether of bisphenol A, that is 2,2-bis-[p-(2,3-epoxypropoxy)-phenyl]propane. Reactive diluents likewise may be used, such as 1,2 epoxy dodecane and the like.

Various ethylenically unsaturated materials are likewise suitable for admixture in the present invention either as an additive with or a substitute for a portion of the epoxy resins. The ethylenically unsaturated materials include but are not limited to vinyl compounds, containing a polymerizable (IV)

group wherein $R_1$ and $R_2$ may be hydrogen, aryl, alkyl, alkoxy, aryloxy, carbazolyl and the like. Such compounds include styrene, alkyl and halo-substituted styrenes such as a-methyl styrene, a-chlorostyrene, ethyl styrene; ortho-, meta- and para-alkyl styrenes such as 2,3-dimethyl styrene, meta-propyl styrene, dichlorostyrene, bromostyrene, etc., vinyl ethers such as isobutyl vinyl ether, cetyl vinyl ether, vinyl methyl ether, vinyl ethyl ether, dodecyl vinyl ether, vinyl 2-chloroethyl ether, vinyl 2-ethylhexylether, vinyl isopropyl ether, vinyl decyl ether, vinyl 2-ethoxyethyl ether, vinyl methoxymethyl ether, vinyl benzyl ether, vinyl 3-phenylpropyl ether, vinyl 1-cyclohexyl ethyl ether, vinyl phenyl ether, vinyl carbazoles such as N-vinyl carbazole and the like.

The second component of the coating compositions of the present invention is an epoxy-nitrile monomer. The epoxy-nitrile monomer is any chemical substance containing both an epoxy group

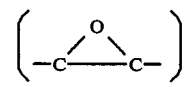

and a nitrile group (CN) and is capable of polymerization. During cure, polymerization of the epoxy resin and the epoxy-nitrile monomer is induced. The epoxy-nitrile monomer can act as a reactive solvent, comonomer and viscosity and rheology controlling agent for the mixture of the epoxy and epoxy-nitrile resin. The coating compositions of the present invention are classified as 100 percent solids because the epoxy resin is mixed or dissolved in the epoxy-nitrile monomer which crosslinks with epoxy resins and epoxy-nitrile monomers upon activation of the curing agent. However, minor amounts of solvents may optionally be used which may be volatile, which does not defeat the object of this invention, to provide a substantially 100 percent solid coating composition.

These epoxy-nitrile monomers can be employed either alone or in combination. The coating compositions generally contain, in percentage of total weight, from about 5 percent to about 95 percent, preferably from 15 percent to about 65 percent, and most preferably from about 20 percent to about 50 percent of the epoxy-nitrile compound.

Typical epoxy-nitrile monomers include but are not limited to homologues and derivatives of B-cyanoethyl glycidyl ether, B-cyanobutyl glcidyl ether and the like. Most preferred is B-cyanoethyl glycidyl ether.

In accordance with the present invention cure occurs by known curing methods in the art. Epoxy resins may be cured both catalytically or stoichiometrically.

Catalytic curing agents are a group of compounds which promote epoxy reactions without being consumed in the process. The catalytic curing agents and the cure of the resin using these agents are generally well known in the art. The amount of catalyst used is about 1 to 10 weight percent. This type of catalyst is activated by heat. A heating condition of about 85° C. is needed. The upper limit of the heating temperature and the length of time of heating is dependent upon various factors such as the thermal deterioration point and decomposition point of the films and also by heat desirability of the object to be cured. The epoxy/epoxy-nitrile catalytic curing agent mixtures are indefinitely stable at room temperature so that the pot life of the system is extremely long. Acidic curing agents are catalytic and include but are not limited to carboxylic acids, anhydrides, dibasic organic acids, phenols, Lewis acids and others. Common catalytic curing agents include but are not limited to benzyldimethylamine, boron trifluoride monoethylamine, formic acid, benzoic acid, formic anhydride, acetic anhydride, oxalic acid, malonic acid, succinic acid, ortho-, meta-, para-cresol and the like.

Stoichiometric curing agents are a group of compounds in which the curing agents are used up in the cure process. The stoichiometric curing agents and the cure of the resin using these agents are generally well known in the art. Curing generally occurs slowly at ambient temperature resulting in a pot life for about a week, and as the temperature is increased the time of cure speeds up, upon mixing the epoxy with the stoichiometric curing agent. The rate of the reaction depends upon the chemistry of the stoichiometric curing agents, the epoxy resins and epoxy-nitrile monomers. Tertiary amines and similar compounds can be used in conjunction with basic compounds to accelerate polymerization of the epoxy materials. The basic curing agents employed in epoxy resin technology are stoichiometric and include but are not limited to Lewis bases, inorganic bases, primary and secondary amines, amides and others. Example of suitable stoichiometric curing agents are polysulfides in particular mercapto terminated polyoxyethylene; aliphatic amines, in particular cyclohexyl amine; polyamides in particular triethylene tetramine; amidoamines, in particular the reaction product of ethylene diamine with linoleic acid dimer; aroaatic amines, in particular aniline; anhydrides, in particular proprionic anhydride; melamine-formaldehyde; urea-formaldehyde; phenol-formaldehydes in particular t-butyl phenol-formaladehyde; and the like.

Another class of curing agents that may be employed are photoinitiated curing agents. The photoinitiator curing agents and the cure thereof are generally well known in the art. Examples of suitable photoinitiator curing agents include benzophenone, dye sensitizers, triaryl sulfonium salts, benzoin ethers, substituted acetophone, Michler's ketone, benzil and the like. The coating composition is cured from irradation in the range of ultraviolet to visible light. The light source emits wavelengths in the spectrum from about 1,000 Å to about 6.000 Å. The systems used to generate irradiation for the photoinitiated cure can be any known in the art such as low pressure, medium pressure, high pressure or super high pressure mercury lamps; mercury, carbon and plasma arc lamps; xenon lamps; UV light emitting diodes; UV emitting lasers and the like. The coating mixture can also be cured using an electron beam apparatus. Further, the coating mixture can be cured by tungsten lamps, sunlight and the like.

It will be readily apparent to those skilled in the art that the coating compositions of the instant invention may be further modified by the addition of plasticizers, stabilizers, pigments, dispersants, defoamers, surfactants. extenders, fillers, reinforcing agents and other film formers. The coating compositions of the instant invention may also optionally contain various flattening agents, surface active agents, thixotropic agents, UV light absorbers, flow control agents, viscosity agents, antioxidant agents and dyes. All these additives and the use thereof are well known in the art and do not require extensive discussion, it being understood that any compound possessing the ability to function in such a manner, i.e., as a flattening agent, surface active agent, UV light absorber and the like, can be used so long as they do not deleteriously affect the curing of the coating composition and do not adversely affect the characteristics of the coating.

It will be appreciated therefore that the polymerizable material of the epoxy resins, epoxy-nitrile monomers, curing agents and any other modifiers should be chemically compatible with each other.

In the practice of this invention, the coating compositions are first compounded by adding together the epoxy resins and the epoxy-nitrile monomers to form a mixture. To this mixture is added the curing agents, with stirring. Optionally, at any step in the process prior to the cure, any of the aforementioned additives may be stirred into the mixture. The various components are thoroughly mixed so as to form a generally homogeneous coating mixture.

A relatively uniform film of coating mixture is applied onto a substrate by any of the known means such as wire wound rod, Guardco ® wet film applicator rods, knife, bar, airless spraying, dipping, roller coating, flowing, brushing, conventional and/or electrostatic spray gun, electrodeposition, and the like. The various substrates employed can be wood, paper, metal, pretreated metal, plastic and the like. Generally, the coating composition is applied in an amount sufficient to provide a dry cured coating thickness of from about .1 mil to about 20 mil, preferably from about 3 mil to about 15 mil. Optionally, multiple coats of the composition may be applied to the substrate. By selection of components and additives the coating compositions may be applied both as transparent coatings or opaque coatings.

The coating mixture is then cured and solidified to form the coating compositions. After cure, there is present on the surface of the substrate a hard, non-tacky, mar, adhesion and chemical resistant coating which tenaciously adheres to the substrate.

FIG. 1 is a 35 mm photograph of a metal substrate coated with an epoxy nitrile coating composition that has been prepared according to the invention and exposed to salt fog testing for 100 hours according to example 1. The coating composition/metal substrate showed no appreciable rust.

Figure 2:
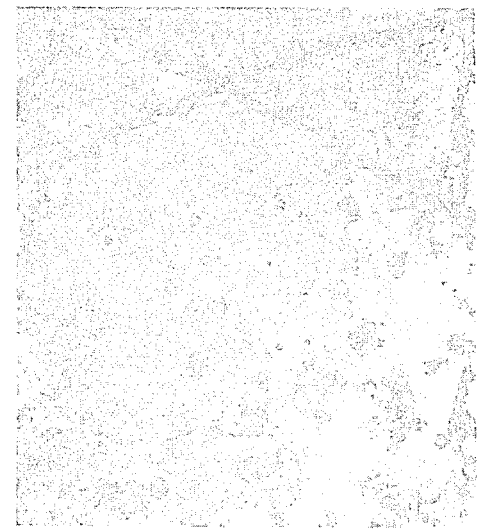
FIG. 2 is a 35 mm photograph of a salt fog tested metal substrate coated with an epoxy coating composition, of comparative Example A which is "representative of the prior art".

FIG. 2 is a 35 mm photograph of a metal substrate coated with an epoxy nitrile coating composition that employs substantial amount of solvent and which is representative of the prior art according to comparative example A. The coating composition/metal substrate shows a substantial amount of rusting, pinholes and voids after 100 hours of salt fog testing.

The coating compositions of the present invention are comprised of the reaction products of the epoxy resin and the epoxy-nitrile monomer. It is theorized that the curing agent attacks and opens the epoxy rings of both the epoxy resin and the epoxy-nitrile monomer. These opened epoxy rings are reactive and form crosslinked polymeric networks. Furthermore, the polymeric network contains epoxy groups reacting to form hydroxyl groups that provide chemical bonds to the substrate. The use of in situ copolymerization allows this system to be 100 percent solids. 100 percent solids coating compositions occur because the epoxy resin and the epoxy-nitrile compound form homogeneous mixtures in the absence of additional solvent materials and copolymerize in situ; thus there is no need to use volatile solvents. The coating compositions' superior properties are derived not only from the ability of the polymer matrix to crosslink and graft but also from the novel multifunctional combination of epoxy and nitrile moieties resulting in excellent adhesion, high chemical resistance, durability of the epoxy resins properties with the improved barrier properties of nitrile resins.

The coating compositions of the present invention being copolymerized epoxy epoxy-nitriles have a lower molecular weight with equivalent epoxy functionality and a higher nitrile content than homopolymerized epoxy-nitriles. Further, the copolymerized epoxy epoxy-nitriles have the nitrile groups bonded at the terminal endcap of the operational resin, whereas the homopolymerized epoxy-nitriles have the nitrile function grafted into the mid portion of the resin backbone.

SPECIFIC EMBODIMENTS

The following examples demonstrate the process and advantages of the present invention.

Test Method

The following compositions 1, 2, A and B were prepared by mixing the listed components of the coating compositions together to form a mixture. The resulting mixture was stirred to form generally a homogeneous mixture of the composition.

The coating compositions of 1, 2, A and B were then applied to the surface of 4"×6"×0.032" steel test panels. Coated panel 1 was catalytically cured with boron trifluoride monoethyl amine for about 6 hours at approximately 130° C. Coated panels 2, A and B were stoichometrically cured with a polyamide curing agent for about 2 hours at approximately 100° C. All coated panels were post cured at room temperature overnight.

The coating compositions were applied onto the following three different test panels;

R-46 which is a cold rolled steel untreated matte finished panel, from Q-Panel Co., Cleveland, Ohio;

B-40 which is a cold rolled zinc phosphate pretreated steel panel, from Parker Co., Detroit, Mich.; and B-1000 which is a cold rolled iron phosphate pretreated steel panel from Parker Co., Detroit Mich.

In each case, ASTM standard adhesion (tape test), hardness (pencil), reverse impact and salt fog (rust) testing of the coated metal substrate was carried out.

The thickness of the cured dry coatings are non-destructively measured by an electronic probe based on magnetic conduction and eddy current. The thickness of the following coating compositions 1,2,A and B were approximately 2.0 ml.

The adhesion tape test (ASTM D 3359=78) was carried out by applying a strip of standard tape to a cross-cut section previously made by a sharp tool in the coated substrate. The tape was then removed by briskly snapping it off. The amount of adhesion, of coating remaining on the substrate, was assessed on a 0 to 5 scale with no adhesion being 0 and 100 percent adhesion being no loss of coating and rated as a 5.

The hardness test measures the rigidity of the organic coating applied to rigid substrates such as metal panels. The hardness test, (ASTM D 3363-74) was carried out by forcing pencil leads of increasing hardness values against the coated surface in a precisely defined manner, until one lead mars the surface. Surface hardness is defined by the hardest pencil lead which just fails to mar the coated surface. Test ranges are 1H to 8H with 8H being excellent, that is, the hardest lead failed to mar the coating.

The impact (ASTM D 2794-82) test measures the tendency for a coating to crack after being deformed by an impacting force. A falling stainless steel ball weight hits a panel with the coated side down for the reverse impact test. The height of the fall in inches multiplied by the dropping weight in pounds is the impact energy. To pass the test, a standard tape is applied to the impacted area and snapped off and the coating must remain intact. Test ranges are from 0 to 160 inch-pounds (in-1b), with 160 meaning there is no loss of coating after the tape is snapped off and 0 meaning a failure.

The coating compositions 1, 2, A and B were also applied to duplicate panels and were cured and tested as described above. The duplicate panels were subjected to salt exposure (ASTM B 117) testing. Salt fog testing was carried out by masking with black tape uncoated portions of the panel. Then the rest of the panel is coated with the coating composition and a large X is scribed in the dried coated panel. The panel is placed in a salt-fog cabinet for a given period of time. The cabinet induced accelerated corrosion testing through exposure of the samples to a warm salt-fog atmosphere. The coating compositions 1 and A were exposed to 100 hours of salt fog testing and coating compositions 2 and B were exposed to 75 hours of salt fog testing. A rating is given based on the degree of rusting of the samples. Test ranges are 0 to 10, with a 0 rating for all rust and a 10 rating for no appreciable rust, furthermore, the scale is logarthmic between the two extreme endpoints.

The results of the tests are shown in Table 1 and FIGS. 1 and 2. Coating compositions of the Specific Examples.

EXAMPLE 1

| Composition | Percent |
| --- | --- |
| Shell Epon ®* 828 Liquid Epoxy Resin | 45.5 |
| B-Cyanoethyl Glycidyl Ether | 45.5 |
| Cyanamid ®** Beetle 216-8 Resin | 5.0 |
| Boron Trifluoride Monoethyl Amine | 4.0 |

EXAMPLE 2

| Composition | Percent |
| --- | --- |
| Dow Epoxy Novolak (D.E.N.) ®*** 438 | 42.5 |
| B-Cyanoethyl Glycidyl Ether | 42.5 |
| Diethylene Triamine | 14.0 |

-continued

| Composition | Percent |
| --- | --- |
| SR ®**** 882 Silicone Resin | 1.0 |

EXAMPLE A

| Composition | Percent |
| --- | --- |
| Acrylonitrile Substitute Shell 1001 F Resin ®* | 49.2 |
| Toluene solvent | 28.3 |
| Ethylene Glycol Dimethyl Ether Solvent | 13.7 |
| Cyanamid ®** Beetle 216-8 | 2.8 |
| Diethylene Triamine | 4.5 |
| Triethyl Amine | 1.5 |

EXAMPLE B

| Composition | Percent |
| --- | --- |
| Dow Epoxy Novolak (D.E.N.) ®*** 438 | 47.0 |
| Toluene Solvent | 15.7 |
| Methyl Ethyl Ketone Solvent | 15.7 |
| Ethylene Glycol Monomethyl Ether Solvent | 15.6 |
| Diethylene Triamine | 5.5 |
| SR ®*** 882 Silicone Resin | 0.5 |

*Available from Shell Oil Company, Chicago, Illinois, commercial grade.
**Available from American Cyanamide Company, Wayne, New Jersey, commercial g
***Available from Dow Chemical Company, Cleveland, Ohio, commercial grade.
****Available from General Electric Company, Waterford, New Jersey, commercial grade.

The inventive examples employ a solvent free system, that is the epoxy-nitrile of B-cyanoethyl glycidyl ether in examples 1 and 2 acts as a solvent and copolymer with the epoxy resin. The comparative examples "representative of the prior art", employ substantial amounts of solvents, that is example A is 42 percent solvents of toluene and ethylene, glycol dimethyl ether and example B is 47 percent solvent of toulene, methyl ethyl ketone and ethylene glycol monomethyl ether.

The results of the novel coating compositions of the present invention demonstrate excellent adhesion, hardness, reverse impact strength and good to excellent salt fog rating. In comparing example 1 and comparative example A (see data Table 1 and FIGS. 1 and 2) it is readily apparent that the coating composition of the instant invention shows superior corrosion resistance than the comparative coating composition. In comparing example 2 and comparative example B it is readily apparent that the coating composition of the instant invention shows superior reverse impact strength and good adhesion compared to the comparative coating composition. These results exemplify the excellent adhesion, hardness, good barrier properties and corrosion resistance of the coating compositions of the instant invention.

The coating compositions of the instant invention can be employed for various uses, even where all the test properties are not required for good coating compositions, for example a good corrosion resistant coating might not be required in an environment requiring high impact strength.

Although the invention has been described in detail through the preceeding examples, these examples are for the purpose of illustration only, and it is understood that variations and modifications can be made by one skilled in the art without departing from the spirit and the scope of the invention.

TABLE I

| Composition | Substrate | Adhesion | Hardness | Reverse Impact (in-lb) | Salt Fog |
| --- | --- | --- | --- | --- | --- |
| 1 | R-46 | 5 | 5 | 0 | 10 |
|   | B-40 | 5 | 5 | 0 | 9 |
|   | B-1000 | 5 | 5 | 80 | 10 |
| 2 | R-46 | 5 | 8 | 160 | 2 |
|   | B-40 | 5 | 7 | <20 | 2 |
|   | B-1000 | 5 | 4 | 160 | 2 |
| A | R-46 | 5 | 6 | 160 | 2 |
|   | B-40 | 5 | 5 | 0 | 5 |
|   | B-1000 | 5 | 5 | 160 | 6 |
| B | R-46 | 1 | 6 | <20 | 7 |
|   | B-40 | 4 | 8 | <20 | 8 |
|   | B-100 | 4 | 8 | <20 | 9 |

We claim:

1. A process for preparing an epoxy nitrile coating comprising:
   (a) forming a mixture of an epoxy resin with an epoxy-nitrile monomer and a curing agent,
   (b) applying the mixture to a substrate to form a coating, and
   (c) effecting cure of the coating to form the epoxy nitrile coating composition.

2. The process of claim 1 wherein said coating composition is applied at a thickness from about 0.1 mil to about 20 mil.

3. The process of claim 2 wherein said coating composition is applied at a thickness from about 3 mil to about 15 mil.

4. The process of claim 1 wherein said curing agent is catalytic and the cure is effected by heating the mixture.

5. The process of claim 4 wherein said heating is a temperature of about 85° C.

6. The process of claim 4 wherein said catalytic curing agents are selected from the group consisting of benzyldimethylamine, boron trifluoride monoethylamine and combinations thereof.

7. The process of claim 1 wherein said curing agent is stoichiometric and the cure occurs slowly at room temperature for about 1 week.

8. The process of claim 7 wherein said stoichiometric curing agents are selected from the group consisting of polysulfides, aliphatic amines, polyamides, amidoamines, aromatic amines, anhydrides, melamine-formaldehydes, urea-formaldehydes, phenol-formaldehydes and combinations thereof.

9. The process of claim 7 wherein said stoichiometric curing agents are selected from the consisting of cyclohexyl amine, aniline, proprionic anhydride and mixtures thereof.

10. The process of claim 1 wherein said curing agent is a photoinitiator and the cure is effected by subjecting the mixture to radiation.

11. The process of claim 10 wherein said irradiation comprises wavelengths of the spectrum from about 1,000A to about 6,000A.

12. The process of claim 10 wherein said photoinitiated curing agents are selected from the group consisting of benzophenone, triaryl sulfonium salts, benzoin ethers, substituted acetophene, benzils and combinations thereof.

13. The process of claim 1 wherein said epoxy nitrile coating is produced in the absence of a solvent.

14. The process of claim 1 wherein said coating comprises from about 95 percent to about 5 percent epoxy resin.

15. The process of claim 1 wherein said coating comprises from about 85 percent to about 35 percent of the epoxy resin.

16. The process of claim 1 wherein said coating comprises from about 80 percent to about 50 percent of epoxy resin.

17. The process of claim 1 wherein said epoxy resin is selected from the group consisting of diglycidyl ethers of bisphenol A, diglycidyl ethers of novolak epoxy resins, esters of epoxidized cyclic alcohols, esters of epoxidized cycloalkanecarboxylic acids, halogenated epoxides, bisphenol F epoxides and combinations thereof.

18. The process of claim 1 wherein said coating comprises about 5 percent to about 95 percent epoxy nitrile monomer.

19. The process of claim 1 wherein said coating comprises from about 15 percent to about 65 percent epoxy nitrile monomer.

20. The process of claim 1 wherein said coating comprises from about 20 percent to about 50 percent epoxy nitrile monomer.

21. The process of claim 1 wherein said epoxy-nitrile monomer is selected from the group consisting of B-cyanoethyl glycidyl ether, B-cyanobutyl glycidyl ether and mixtures thereof.

22. The process of claim 1 wherein said epoxy-nitrile monomer is B-cyanoethyl glycidyl ether.

23. A process for preparing solvent free epoxy nitrile coating comprising:
    (a) forming a mixture of an epoxy resin with an epoxy-nitrile monomer and a curing agent,
    (b) applying the mixture, in the absence of a solvent, to a substrate to form a coating, and
    (c) effecting cure of the coating to form the epoxy nitrile coating composition.

24. A process for preparing a solvent free epoxy nitrile coating comprising an in situ copolymerization of an epoxy resin, an epoxy-nitrile monomer and a curing agent.

* * * * *